US008459611B2

United States Patent
Allen

(10) Patent No.: US 8,459,611 B2
(45) Date of Patent: *Jun. 11, 2013

(54) SYSTEM FOR THE SIMULTANEOUS INTRODUCTION OF TWO ITEMS INTO A CONDUIT

(75) Inventor: Jerry L. Allen, Westfield Center, OH (US)

(73) Assignee: WESCO Distribution, Inc., Pittsburgh, PA (US)

( * ) Notice: Subject to any disclaimer, the term of this patent is extended or adjusted under 35 U.S.C. 154(b) by 794 days.

This patent is subject to a terminal disclaimer.

(21) Appl. No.: 12/214,093

(22) Filed: Jun. 17, 2008

(65) Prior Publication Data

US 2009/0056122 A1   Mar. 5, 2009

Related U.S. Application Data

(63) Continuation-in-part of application No. 11/897,101, filed on Aug. 30, 2007, now Pat. No. 8,387,954.

(51) Int. Cl.
| | |
|---|---|
| *B63B 35/03* | (2006.01) |
| *B65H 59/00* | (2006.01) |
| *E21C 29/16* | (2006.01) |
| *H02G 1/08* | (2006.01) |
| *H01R 43/00* | (2006.01) |

(52) U.S. Cl.
USPC ............... 254/134.3 R; 254/134.4; 29/868

(58) Field of Classification Search
USPC ............... 254/134.3 R, 134.3 F, 134.4 R
See application file for complete search history.

(56) References Cited

U.S. PATENT DOCUMENTS

| 252,956 | A | * | 1/1882 | Loane | 254/134.4 |
| 3,119,599 | A | * | 1/1964 | Tattle | 254/134.4 |
| 3,547,406 | A | * | 12/1970 | Fowler et al. | 254/134.4 |

(Continued)

FOREIGN PATENT DOCUMENTS

| DE | 92 06 027 | 8/1992 |
| DE | 195 24 917 | 1/1997 |
| EP | 1 339 146 | 8/2003 |

OTHER PUBLICATIONS

European Search Report dated Nov. 12, 2008 (5 pages).

(Continued)

*Primary Examiner* — Lee D Wilson
*Assistant Examiner* — Alvin Grant
(74) *Attorney, Agent, or Firm* — Renner, Kenner, Greive, Bobak, Taylor & Weber

(57) ABSTRACT

A system (10) for simultaneously introducing a cable (11) and another item (21) into a conduit (12) includes a pushing machine (13) and an air blower (15) which introduces the cable (11) into the conduit (12). The conduit (12) is split near the pushing machine (13) so that the item (21) may be attached to the cable (11) by means of an attachment device (25) carried by a bullet head (23) at the leading end of the cable (11). Alternatively, a projectile (35) may be attached to the leading end of the cable (11) and the item (21) may be attached at the junction of the cable (11) and projectile (35). A block (18) then connects the split ends (16, 17) of the conduit (12), and the cable (11) and other item (21) may then be moved together through the conduit (12) by the pushing machine (13) and air blower (15) which moves air against the projectile (35) to assist such movement.

19 Claims, 2 Drawing Sheets

U.S. PATENT DOCUMENTS

| | | | |
|---|---|---|---|
| 4,202,531 A * | 5/1980 | Hamrick | 254/134.4 |
| 4,367,769 A * | 1/1983 | Bain | 138/114 |
| 4,773,628 A * | 9/1988 | Aleshire | 254/134.4 |
| 4,783,054 A * | 11/1988 | Morel et al. | 254/134.4 |
| 4,850,569 A * | 7/1989 | Griffioen et al. | 254/134.4 |
| 4,934,662 A | 6/1990 | Griffioen et al. | 254/134.4 |
| 5,022,634 A * | 6/1991 | Keeble | 254/134.4 |
| 5,197,715 A | 3/1993 | Griffioen | 254/134.4 |
| 5,645,267 A * | 7/1997 | Reeve et al. | 254/134.4 |
| 5,884,384 A * | 3/1999 | Griffioen | 29/468 |
| 5,897,103 A * | 4/1999 | Griffioen et al. | 254/134.4 |
| 5,922,995 A * | 7/1999 | Allen | 174/95 |
| 5,967,495 A * | 10/1999 | Kaminski et al. | 254/134.4 |
| 6,012,621 A * | 1/2000 | Hoium et al. | 226/35 |
| 6,019,351 A * | 2/2000 | Allen | 254/134.4 |
| 6,170,804 B1 * | 1/2001 | Allen | 254/134.4 |
| 6,561,488 B1 * | 5/2003 | Walker | 254/134.4 |
| 6,619,697 B2 * | 9/2003 | Griffioen et al. | 285/126.1 |
| 6,681,795 B2 * | 1/2004 | Beals et al. | 137/318 |
| 6,880,219 B2 * | 4/2005 | Griffioen et al. | 29/401.1 |
| 6,947,647 B2 * | 9/2005 | Beals et al. | 385/100 |
| 7,100,274 B2 * | 9/2006 | Sylvia et al. | 29/819 |
| 7,621,505 B2 * | 11/2009 | Hamrick | 254/134.3 FT |
| 7,740,230 B2 * | 6/2010 | Oberli et al. | 254/134.4 |
| 2002/0083976 A1 * | 7/2002 | Beals et al. | 137/317 |
| 2002/0189671 A1 * | 12/2002 | Beals et al. | 137/317 |
| 2004/0025330 A1 * | 2/2004 | Sylvia et al. | 29/700 |
| 2004/0247264 A1 * | 12/2004 | Beals et al. | 385/100 |
| 2005/0067608 A1 * | 3/2005 | Griffioen et al. | 254/134.4 |
| 2005/0242331 A1 * | 11/2005 | Ames et al. | 254/134.3 FT |
| 2006/0054874 A1 * | 3/2006 | Oberli et al. | 254/134.4 |
| 2006/0147163 A1 * | 7/2006 | Mayhew et al. | 385/100 |
| 2009/0056122 A1 * | 3/2009 | Allen | 29/868 |
| 2009/0057628 A1 * | 3/2009 | Allen | 254/134.3 R |

OTHER PUBLICATIONS

Mulegun (website 2 pages; NEPTCO Inc., Pawtucket, RI.
Vikimatic Cable Blowing Equipment (1995; 4 pages; Vikimatic Sales, Wadsworth, OH).
Duct Rodders (website 1 page; Condux International, Inc., Mankato, MN).
Condux Fiber Optic Cable Blower (1997; 6 pages; Condux International, Inc., Mankato, MN).

* cited by examiner

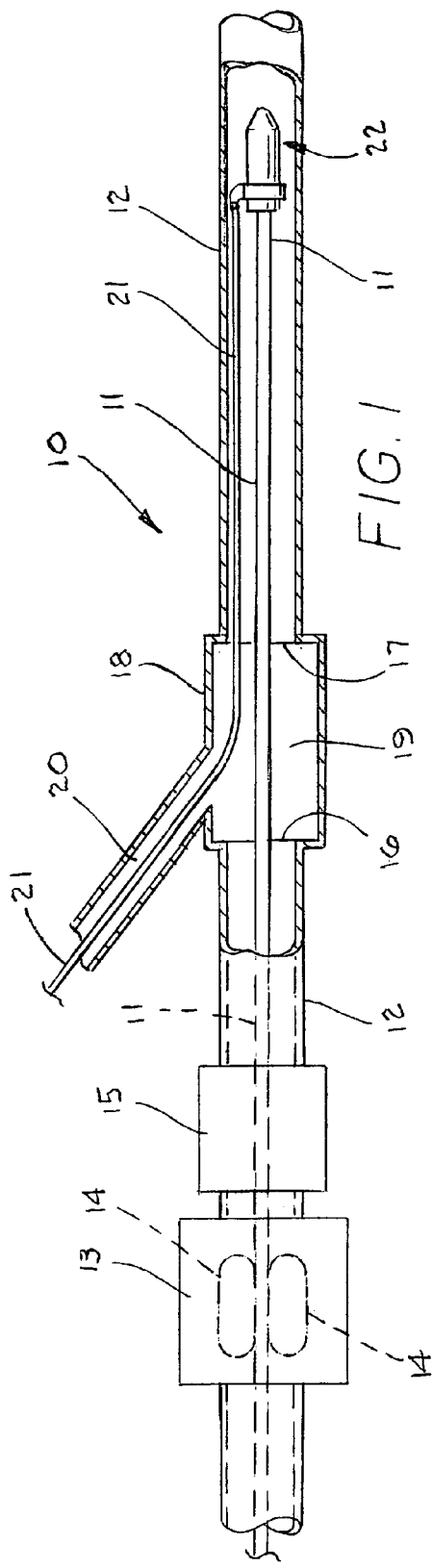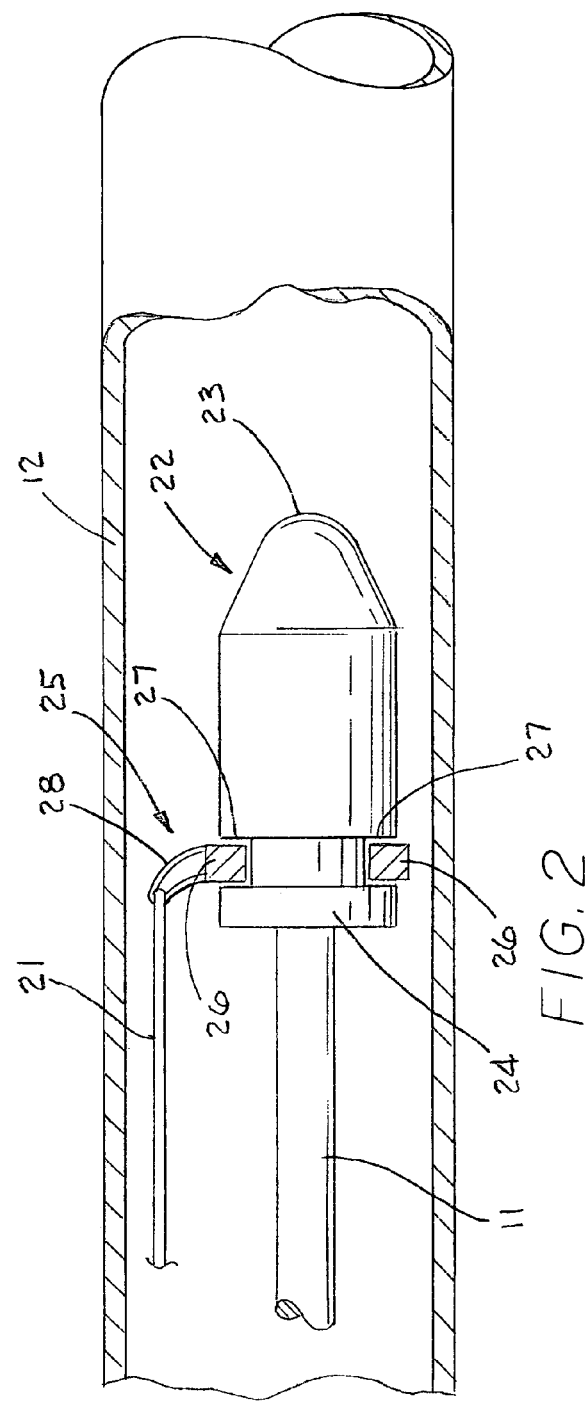

SYSTEM FOR THE SIMULTANEOUS INTRODUCTION OF TWO ITEMS INTO A CONDUIT

CROSS-REFERENCE TO RELATED APPLICATION

This application is a continuation-in-part of U.S. patent application Ser. No. 11/897,101 filed Aug. 30, 2007 now U.S. Pat. No. 8,387,954.

TECHNICAL FIELD

This invention relates to the introduction of items, such as cables, pull tapes, innerducts or the like, into an underground conduit. More particularly, this invention relates to a system wherein at least two such items can be introduced simultaneously.

BACKGROUND ART

The efficient introduction of cables into an underground conduit, which may extend for several thousand feet, has long been a problem. Such conduits are often designed to hold a plurality of cables such as for use in the telecommunications industry. The placing of the first cable in the conduit is the least problematic. Traditionally, the cable is inserted by means of a pushing device, and the insertion is assisted by a flow of air which is blown into the conduit.

Because the first cable will generally undulate within the conduit, a second cable cannot be readily positioned in the conduit by the same pushing/air blowing procedure. Rather, a pulling mechanism, usually in the form of a tape, must be positioned in the conduit. Then the second cable is attached to the pull tape which is then used to attempt to pull the second cable into the conduit.

While the pull tape is easier to insert, because of its flexibility compared to a cable, such still represents a somewhat complex procedure. In some instances where the first cable in the conduit is relatively straight, with only minimal undulations, it may be possible to use the air blowing process to insert the tape. In more impeded situations, such as a duct with a plurality of cables already in it or a duct with one undulating cable in it, a rodder system must be utilized. In this system, a relatively rigid rod is inserted and finds its way through the cable(s) to the other end of the conduit. Then the pull tape is attached to the rod and the rod is pulled back.

These systems are quite expensive to employ as they require multiple labor intensive, time consuming passes through the conduit using the expensive equipment, and even then these systems are normally only effective over short distances. The need exists, therefore, for a viable alternative to the existing systems.

DISCLOSURE OF THE INVENTION

It is thus an object of the present invention to provide a system which more efficiently permits the installation of more than one item into a conduit.

It is another object of the present invention to provide a system, as above, where at least two items are simultaneously introduced into the conduit.

These and other objects of the present invention, as well as the advantages thereof over existing prior art forms, which will become apparent from the description to follow, are accomplished by the improvements hereinafter described and claimed.

In general, a method of simultaneously introducing a cable and another item into an elongate conduit includes the steps of introducing a cable into one end of the conduit, introducing the item into the conduit downstream of the one end of the conduit, connecting the item to the cable, and moving the cable and the item through the conduit.

A system for simultaneously inserting a cable and another item into an elongate conduit having a split therein includes pushing means to introduce a cable into one end of the conduit and push the cable toward the split in the conduit. A block connects the split in the conduit, the block including means to introduce the item into the conduit. Means are provided to attach the item to the cable so that the pushing means may move the cable and the item through the conduit to the other end thereof.

Preferred exemplary systems for the simultaneous introduction of a cable and another item into a conduit according to the concepts of the present invention are shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 1 is a schematic representation of a system for simultaneously introducing a cable and another item into a conduit.

FIG. 2 is an enlarged schematic view showing the leading end of the cable and the manner in which the item is connected to the cable.

PREFERRED EMBODIMENTS FOR CARRYING OUT THE INVENTION

Figure 3:
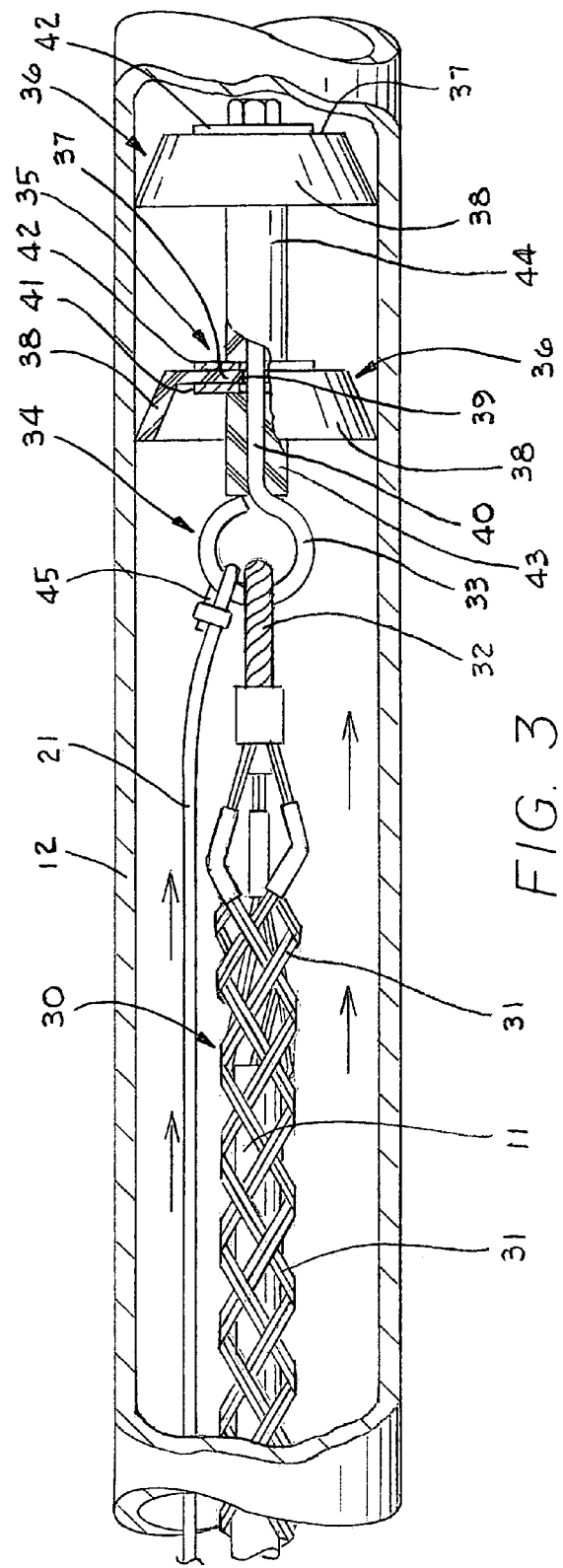
FIG. 3 is a view similar to FIG. 2 but showing an alternative configuration for the system at the leading end of the cable.

The subject invention relates to a system, generally indicated by the numeral 10, for the simultaneous introduction of a cable 11 or similar item into a conduit 12 of the type that may extend for several thousand feet underground. A supply of cable 11 may be provided in a roll (not shown) to a conventional cable pushing machine 13 shown schematically in FIG. 1. Such machines 13 typically include opposed tractor-like devices 14 which grip cable 11 and push it through conduit 12. This pushing force may be assisted by a conventional air blower 15. The pushing machine 13 and air blower 15 equipment are of the type which can be purchased from Sherman & Reilly, Inc. of Chattanooga, Tenn.

The conduit is split or spliced, somewhat downstream of, but near machine 13 and blower 15, to provide opposed split ends 16 and 17. A split, openable, coupling block 18 joins ends 16 and 17 with a space 19 therebetween. Block 18 can be generally of the type shown in U.S. Pat. No. 6,019,351 to which reference is made, as necessary, for a complete understanding thereof. While block 18 is shown as a separate item, one skilled in the art would appreciate that air blower 15 and block 18 could be commercially provided as one unit without departing from the concept of the present invention. Whether provided with blower 15 or as a separate unit, block 18 is shown as including a passageway 20 through which an item 21 may be introduced. Item 21 may be any type of item that may be desired to be inserted into conduit 12 such as a pull tape, an innerduct sleeve, such as shown in U.S. Pat. No. 6,262,371, or even another cable.

A bullet head, generally indicated by the numeral 22, is shown as being attached to the leading edge of cable 11. As schematically shown in FIG. 2, bullet head 22 includes a round leading surface 23 designed to reduce the friction which might otherwise be cause by the blunt end of cable 11. The base end 24 of bullet head 22 is attached to cable 11 by any suitable means. For example, end 24 may be provided with interior threads to be received on a threaded coupling attached to cable 11. A device to attach the item 21 to bullet head 22 and thus to cable 11 is generally indicated by the numeral 25. Device 25 includes a ring 26 which can be received in a groove 27 formed in base end 24 of bullet head 22. Ring 26 can carry a loop 28 to which item 21 is attached. As such, device 25 can rotate or swivel on bullet head 22 as ring 26 is free to move in groove 27. Such motion can be helpful as head 22 moves through turns or the like in conduit 12.

In the operation of system 10, block 18 is open and the end of cable 11 having head 22 thereon is fed to the area of space 19 between spliced conduit ends 16 and 17. At that location, the end of the item 21 to be inserted with cable 11 is attached to bullet head 22, as just described. Then block 18 is closed and sealed to join the two conduit ends 16 and 17. At this point, operation of pushing machine 13 and blower 15 will move cable 11 and item 21 simultaneously through conduit 12.

An alternative arrangement at the leading edge of cable 11 is shown in FIG. 3. In this embodiment a conventional device, generally indicated by numeral 30 and known in the art as a "Kellums Grip", is attached to the leading end of cable 11. Device 30 is much like a "Chinese finger" in that it has a braided end 31 which receives cable 11 and a connector loop 32 at the opposite end, such that when a pulling force is applied to loop 32, the braided end 31 maintains a tighter grip on the cable 11.

Loop 32 is connected to the looped head 33 of an eyebolt, generally indicated by the numeral 34, which carries a device known in the art as a projectile generally indicated by the numeral 35. Conventional projectiles take on a wide variety of configurations and are intended to catch air being moved through conduit 12 by blower 15 to thereby aid in the propulsion of cable 11 through the conduit 12.

The specific projectile 35 shown includes spaced cups generally indicated by the numeral 36. Each cup 36 is made of a flexible rubber or synthetic material and includes a base portion 37 with a continuous sidewall 38 extending from the periphery thereof. As shown, sidewall 38 extends to and touches the inside of conduit 12. An aperture 39 is provided in each base portion 37, and the shaft 40 of eyebolt 34 extends through the aperture 39 of each cup 36. A washer 41 is positioned around each cup aperture 39 on one side of its base portion 37, and a second washer 42 is positioned around each cup aperture 39 on the other side of its base portion 37. A first tube 43 extends between looped head 33 of eyebolt 34 and the washer 41 of one cup 36, and a second tube 44 extends from the washer 42 of that one cup 36 to the washer 41 of the other cup 56. The shaft 40 of eyebolt 34 extends through tubes 43 and 44 and its threaded end receives a nut 45. When nut 45 is tightened, the components of projectile 35 are located in place on eyebolt 34, and thus on the end of cable 11, as shown in FIG. 3.

In the operation of a system 10 with the leading edge of cable 11 provided with the configuration shown in FIG. 3, block 18 is open and the end of cable 11 having projectile 35 attached thereto is fed to the area of space 19 between spliced conduit ends 16 and 17. At that location, the end of item 21 to be inserted with cable 11 is attached to looped head 33 of eyebolt, as at 45 in FIG. 3. The block 18 is then closed and sealed to join the two conduit ends 16 and 17. At this point, operation of the pushing machine 13 and air blower 15 will move cable 11 and item 21 simultaneously through conduit 12. Such movement is assisted by projectile 35 as the cups 36 catch the air (moving in the direction of the arrows in FIG. 3) and pull cable 11 and item 21 through the conduit 12. Specifically, as the first cup 36 (on the left in FIG. 3) receive the air, its sidewall 38 may actually flex so as not to allow any air pass between the end of sidewall 38 and conduit 12. But the second cup 36 is provided to catch any air that might pass by the first cup 36.

In view of the foregoing, it should thus be evident that systems as described herein accomplish the objects of the invention and otherwise substantially improves the art.

What is claimed is:

1. A method of simultaneously inserting a cable and another item into an elongate conduit comprising the steps of introducing the cable into one end of the conduit, downstream of the one end introducing the item and connecting the item to the cable at one point on the cable, and blowing air past the cable and the item so that the cable and the item are moved together through the conduit while maintaining the item spaced from the cable at all other points on the cable so that a second cable or the like can be subsequently attached to the item and thereafter inserted into the conduit to be in the conduit with the cable.

2. The method of claim 1 further comprising the step of splicing the conduit at the downstream location to introduce and attach the item to the cable at the spliced location.

3. The method of claim 2 further comprising the step of reconnecting the spliced conduit after connecting the item to the cable.

4. The method of claim 3 wherein the step of reconnecting is accomplished by a block connecting the spliced ends of the conduit with the cable and item therebetween.

5. The method of claim 1 further comprising the step of attaching a projectile to the end of the cable being introduced into the conduit.

6. The method of claim 5 wherein the step of connecting the item to the cable includes the step of connecting the item to the point of attachment between the projectile and the end of the cable.

7. The method of claim 5 wherein the step of blowing air past the cable and the item includes the step of blowing air against the projectile.

8. The method of claim 1 wherein the step of connecting the item to the cable includes the steps of attaching a bullet head to the cable and attaching the item to the bullet head.

9. The method of claim 8 wherein the step of connecting the item to the bullet head includes the step of attaching a rotating device on the bullet head and attaching the item to the rotating device.

10. The method of claim 1 further comprising the step of pushing the cable.

11. A system for simultaneously inserting a cable and another item into an elongate conduit having a split therein comprising pushing means to introduce a cable into one end of the conduit and push the cable toward the split in the conduit, a block connecting the split of the conduit, the block including means to introduce the item into the conduit, and means to attach the item to only one point on the cable so that the pushing means may move the cable and the item through the conduit to the other end thereof so that a second cable or the like can be attached to the item and inserted into the conduit along with the cable.

12. The system of claim 11 further comprising blowing means to move air past the cable and the item to assist the pushing means in moving the cable and the item through the conduit.

13. The system of claim 12 further comprising a projectile carried by the end of the cable being inserted into the conduit, said blowing means providing air against said projectile to assist in moving the cable and the item through the conduit.

14. The system of claim 13 wherein said means to attach is provided at the junction of the end of the cable and said projectile.

15. The system of claim 14 wherein said means to attach is part of said projectile.

16. The system of claim 11 wherein there is an area in said block between the split ends of the conduit, and said block includes a passageway communicating with said area, the item being received through said passageway and into the conduit.

17. The system of claim 11 further comprising a head positioned on the leading edge of said cable, said means to attach connecting the item to said head.

18. The system of claim 17 wherein said means to attach includes a ring carrying a loop, said item being attached to said loop.

19. The system of claim 18 wherein said head has a groove therein, said ring being received in said groove so that said loop can rotate around said head.

* * * * *